April 23, 1968  P. PARKER  3,378,859
BABY BED AND MECHANISM FOR ROCKING SAME
Filed Aug. 11, 1966
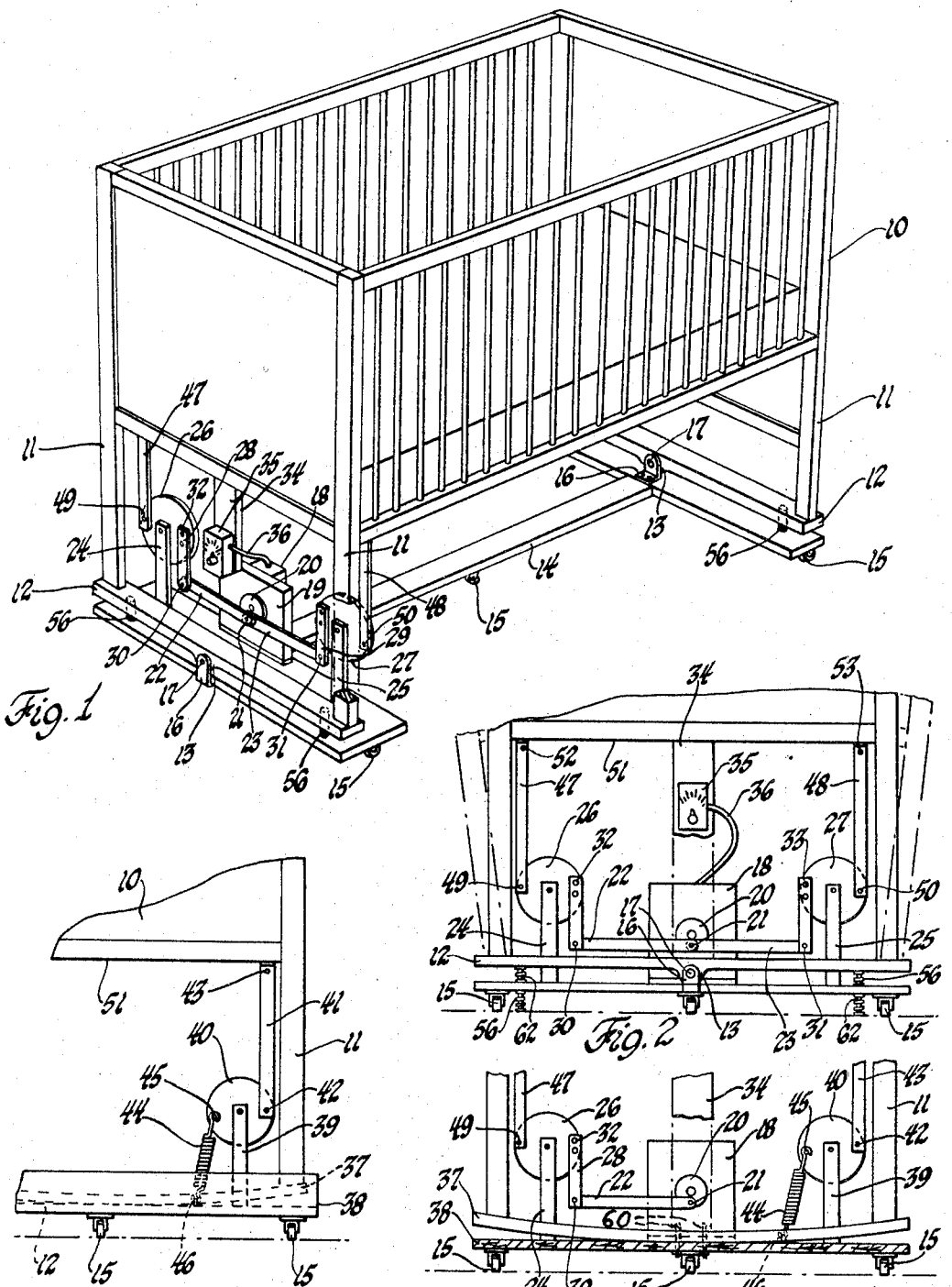
INVENTOR.
Paraque Parker
BY
ATTORNEY

United States Patent Office 3,378,859
Patented Apr. 23, 1968

3,378,859
BABY BED AND MECHANISM FOR ROCKING SAME
Paraque Parker, 180 Bassett, Pontiac, Mich. 48053
Filed Aug. 11, 1966, Ser. No. 571,884
3 Claims. (Cl. 5—109)

ABSTRACT OF THE DISCLOSURE

Means for rocking a baby bed and comprising transverse members secured to the legs of the bed and pivoted, or bowed, and secured to a base member and having a motor driving a disc and an operating linkage connected to the bed for causing it to be mechanically or manually actuated.

This invention relates to beds, and more particularly to a new and unique bed that can be rocked automatically to relieve the mother of the tiresome task necessary each evening of getting a baby to sleep.

In the past many types of baby beds have been constructed starting with the crib with rockers attached thereto, to the more modern baby bed with casters secured to the legs thereof so that the bed may be moved about from place to place.

The instant disclosure not only combines both of these features, but provides means for rocking the bed for a predetermined period of time, and shutting the rocking motion off automatically.

The principal object of the present invention is to provide a new and improved baby bed that may be rolled about, and can be quickly transformed into a rocker-type bed to aid in getting a baby to sleep.

Another object of the invention is to provide a baby bed that may be rocked for a predetermined period of time automatically, and can be shut off automatically.

A still further object is to provide a baby bed rocked automatically, but so constructed that the motion produced simulates that of a mother rocking a baby bed by hand.

Another object is to provide a new and improved baby bed that may be rocked automatically or by hand, as preferred.

The above and other objects of the invention will appear more fully from the following more detailed description, and from the drawing, wherein:

FIGURE 1 is a perspective view of a baby bed showing the automatic rocking mechanism.

FIGURE 2 is an end view of FIGURE 1.

FIGURE 3 shows a modification of the invention showing how the bed may be rocked manually; and FIGURE 4 is an end view showing a still further modification incorporating motor drive and manual operation of the bed.

Referring now to the drawing, the numeral 10 designates a baby bed having legs 11 secured thereto, from which have been removed the casters usually found as part of a standard baby bed today. Attached transversely to the bottom of legs 11, are wooden cross members 12, the same being cut to form an enlarged center portion 13. So that the bed may be further supported, and may also be moved about, there is provided a wooden I-shaped member 14, having casters 15 secured to the bottom thereof so that the bed may be rolled about. Centrally located on the top and bottom of I member 14, are brackets 16 adapted to be attached centrally to the bottom of said I-shaped members and having a pin 17 which in turn passes through cross members 12, at the center 13 thereof so that the bed 10 may be rocked, the brackets 16 being designed to hold cross members 12 and the opposed ends of I-shaped members apart.

To mechanically rock the bed there is provided an electric motor 18 mounted on a block 19, which in turn is mounted on I-shaped cross member. The end of the motor armature passes through block 19 and has rotatably secured thereto a disc 20.

Secured to disc 20, by a single pin 21 are opposed arm members 22, 23, the same being in longitudinal alignment to each other, but are offset on disc 20.

A pair of vertical supports 24, 25, are secured to the top of the I-shaped base to rotatably support disc members 26, 27. Attached to the outer extremity of arms 22, 23, are additional arm members 28, 29, by means of pins. 30, 31, and arms 28, 29, have their outer extremity secured to discs 26, 27 by means of pins 32, 33. Also connected to discs 26, 27, are arm members 47, 48, the same being secured to discs 26, 27 by means of pins 49, 50, and the upper extremity of arms 47, 48, are attached to the under portion of bed frame 51, by pins 52, 53 (FIGURE 2).

An additional support member 34 is located between the bottom of the bed 10 and the cross member 12 (FIGURE 2) the same having mounted thereon an automatic timer 35 and a lead line 36 from the timer to the motor 18. The timer 35 being energized from a lead line to a wall outlet, not shown. As shown in FIGURE 4, support member 34 passes from the under side of bed 10 and rests upon rocker member 37 and is secured thereto by means of two bolts 60 which pass through lower front member and rocker 37 and into brace 34.

A pair of opposed coil springs 56 are provided (FIGURE 2), the same being secured to the under side of cross member 12 by means of a bolt 62 which passes down through member 12, through spring 56 to within approximately one-half inch from the floor.

As shown best in FIGURE 3, there are provided rocker members 37 secured to legs 11 and a guard flange member 38 to prevent a child from getting its foot thereunder. A vertical support 39 is secured to I-shaped end member and has mounted thereon for rotation disc 40. An arm member 41 is secured to disc 40 by pin 42. The upper end of arm 41 is secured to bottom of bed 10 by means of pin 43. A spring 44 has one end thereof secured to disc 40 by pin 45 and the other end thereof secured to the I-shaped base member.

In FIGURE 4 there is disclosed another alternate form of the invention wherein not only rocker members 37, secured to bed legs 11, are substituted for cross members 12, but means are provided to rock the bed automatically or manually. Here the cross members are bent or bowed at their center by the center support 34 to form rocker members which are held against cross members 38 by means of bolts 60, through rocker 37 and into support member 34, at the center of the rockers, and to rock the bed mechanically, just one unit is needed, of the mechanical means shown in FIGURE 2. To rock the bed manually, the unit shown in FIGURE 3 is used.

The manner in which the device operates is as follows:

When one desires to use the atuomatic means to rock the bed, as shown in FIGURE 1, the timer 35 is set to the number of minutes the user wishes to rock the bed and the electric lead line (not shown) from a common electrical wall outer to the timer is plugged in and the timer 35 and motor 18 are both energized. As the armature of motor 18 rotates, it also rotates disc 20 supported thereon, and inasmuch as arms 22, 23, are also connected by pin 21 to rotating disc 20, and the outer ends of arms 22, 23, are connected to arms 28, 29, which are in turn connected to discs 26, 27, on supports 24, 25, and inasmuch as discs 26, 27 also have pivotally secured thereto arms 47, 48, connecting said discs, and the underside of the bed, as at 51, the bed is rocked upon its central pivot 17 in brackets 16 by the movement of—first as disc 20"

is rotated in a clockwise direction, arm 23 secured thereto and to arm 29, which in turn is pivotally secured to disc 27, arm 23 is pulled to the left and arm 29 on disc 27 also rotates disc 27 clockwise, forcing arm 48, which is pivotally connected to disc 27 and bed frame 51 to move downwardly pulling the bed frame down.

As disc 20 continues its rotation, arm 22, also pivotally connected to disc 20, is pulled to the right causing arm 28, pivotally connected to disc 26 to rotate said disc in a clockwise direction, which movement is imparted to arm 47 pivotally connected to disc 26 and bed 51, causing said arm 47 to be pushed upwardly against bed 51, tilting said bed upwardly. This movement is repeated alternately as disc 20 continues to rotate rocking the bed from side to side. As the bed rocks, opposed coil springs 56, secured by means of bolt 62 to the underside of cross member 12 near the opposed ends of member 12, tend to cushion the rocking movement of member 12, the lower end of spring 56 contacting the floor alternately as the bed is rocked. The alternating rocking movement continues during the predetermined time set on the timer 35.

When using the alternate form of the invention shown in FIGURE 3, detach the automatic means for rocking the bed since the motor is not used, and instead of the rocking members 12, shown in FIGURES 1 and 2, rockers 37 are used, the same being secured to legs 11. The user simply pushes the side of the bed with the hand, back and forth and the ends of the cross or rocker members, being secured at their center to the base, are caused to be bent up at one end and down at the other, so that their resilience acts as spring means which is itself effective in rocking the bed. When the bed is pulled toward the one rocking same, arm 41 connecting disc 40 and the under side of the bed 51, moves downwardly on disc 40 against spring 44 and rocker 37 is sprung and moves downwardly on 38. When the side of the bed is released, the spring force in the rocker acts to center and rock the bed over center as the spring 44 pulls disc 40 back and down, and arm 41 moves upward against bed 51 tilting the bed in the opposite direction. This rocking movement is repeated over and over until the child is asleep. The guard member 38 placed in front of the rockers 37 at each end of the base frame prevents a child from placing a foot beneath the rocker and having same crushed.

As shown best in FIGURE 4, there has been incorporated manual and mechanical means for rocking a bed. If it is desired to rock the bed manually, detach the automatic means for rocking and the same procedure is followed as set forth in the operation of the modification shown in FIGURE 3. To operate the bed mechanically, motor 18 is actuated, and disc 20 is rotated in a clockwise direction. Inasmuch as arm 22 is pivotally secured to disc 20 and arm 28 is secured to one end of arm 22 with the other end of same pivotally secured to disc 26, rotatably supported on support 24, as arm 22 moves to the left disc 26 is also moved in a clockwise direction, which movement is imparted to arm 47, one end of which is pivotally connected to disc 26 and the other end thereof to the under-side of the bed frame. As disc 20 continues to rotate, this movement is imparted through linkage 22, 28, disc 26 and arm 47, to the under side of the bed, causing the bed to be moved up and down with a rocking motion. In this embodiment rockers are used, the same resting at their centers on the end portions of I-shaped frame 14 with bolts 62 through front base member, rocker 37 and into brace 34 to hold the rocker in place and allow the same to rock back and forth on the lower front cross member. The guard 38, which is secured to the lower front and rear cross members of the base, FIGURE 3, prevents a child from getting his hands or feet beneath the moving rockers and injuring same.

There has been disclosed herein means whereby a baby bed may be rocked either mechanically or manually in a much smoother manner than heretofore. The bed may be manufactured as a complete unit ready for use or the base and rocking mechanism may be sold separately and the purchaser has simply to remove the casters from his present baby bed and attach the four legs thereof to the rocking mechanism by screws or the like. When using the mechanical means to operate the bed the user has simply to set the timing mechanism for a predetermined period and the bed will be rocked during that period, by the rocking mechanism automatically and the driving motor will be shut off at the desired time. This automatic feature eliminates the necessity of hand rocking. Should the mother desire to hand-rock the baby to sleep, the mechanism disclosed herein, will enable her to produce a more uniform rocking motion than can be produced without said mechanism.

While I have described and illustrated a satisfactory device that has proven highly successful in practical operations, it will be understood that the invention is not limited to specific constructional details shown and described, but that many changes, variations and modifications may be resorted to without departing from the principles of my invention.

I claim:

1. A baby bed and means for mechanically or manually rocking same, comprising, in combination, a bed, opposed transverse rocker members secured to the legs of said bed, a base member adapted to receive and hold said rocker members, means adapted to secure said rocker members and said base member in pivotal relationship with each other, selective means for aiding the manual rocking of said bed comprising a bracket secured to said base member adapted to rotatably support a disc member, a link member pivotally connected to said disc and said bed, and a spring connecting said disc with said base member, and further means for rocking said bed mechanically comprising a motor mounted centrally on said base upon a block member, a driving disc rotatably mounted on the front of said block and rotated by said motor, an additional bracket member secured to said base and adapted to rotatably support a disc member, link members connecting said driving disc and said second mentioned disc, and link means pivotally connecting said last mentioned disc and said bed to tilt said bed once said driving motor is agitated.

2. The baby bed rocking means of claim 1, including: means between the ends of the rocker members secured to the legs of the bed and the underside of the bed for deflecting and holding said rocker members in an arcuate shape, and means for securing the center sections of said rocker members directly to said base member with the ends thereof capable of resilient deflection for providing the pivotal relationship aforesaid.

3. The baby bed rocking means of claim 1, including: spring members disposed between said rocker members and said base between the pivotal connection thereof and their ends, and means for disconnecting said motor from operational control of the rocking movement of said bed in the use of the manual means therefor.

References Cited
UNITED STATES PATENTS

| | | | |
|---|---|---|---|
| 829,354 | 8/1906 | Sarrett | 5—109 |
| 1,842,290 | 1/1932 | Salamon | 5—109 |
| 2,644,958 | 7/1953 | Davis | 5—109 |
| 2,869,145 | 1/1959 | Gregory | 5—109 |
| 3,261,032 | 7/1966 | Reardon | 5—109 X |

CASMIR A. NUNBERG, *Primary Examiner.*